No. 816,061. PATENTED MAR. 27, 1906.
C. E. BAKER & A. W. BURWELL.
PROCESS OF TREATING ORES.
APPLICATION FILED JUNE 5, 1905.
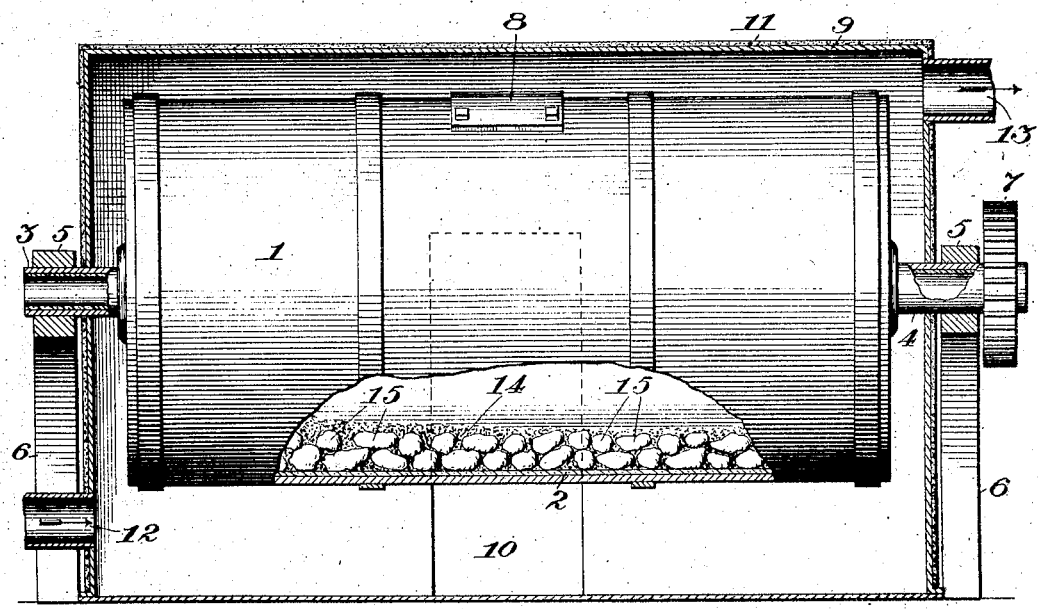
Witnesses: Inventors
Charles E. Baker,
Arthur W. Burwell
by Byrnes & Townsend
Att'ys.

UNITED STATES PATENT OFFICE.

CHARLES E. BAKER AND ARTHUR W. BURWELL, OF CLEVELAND, OHIO.

PROCESS OF TREATING ORES.

No. 816,061.          Specification of Letters Patent.         Patented March 27, 1906.

Application filed June 5, 1905. Serial No. 263,824.

*To all whom it may concern:*

Be it known that we, CHARLES E. BAKER and ARTHUR W. BURWELL, citizens of the United States, residing at Cleveland, in the county of Cuyahoga and State of Ohio, have invented certain new and useful Improvements in Processes of Treating Ores, of which the following is a specification.

In our Patent No. 741,439, dated October 13, 1903, we have described and claimed a process of treating ores containing a metal or metals in combination with sulfur or other metalloid which consists in combining the metal and metalloid with chlorin and supplying sufficient heat to vaporize and separate the metalloid chlorid. We have now discovered that under proper conditions we may so operate as to produce only the chlorid of the metal or metals of the ore, the metalloid being separated in elemental state. The term "ore" is employed to include concentrates, matte, and other material containing a metal or metals and a metalloid or metalloids in combination. The process will be described as applied to the treatment of a sulfid ore.

The suitably-crushed and preferably dry sulfid ore is charged into a revolubly-mounted drum constructed of or lined with material resistant to chlorin and subjected therein with or without the application of heat to chlorin in quantity sufficient to combine with the metals only of the ore, thereby separating sulfur in a physical state which will depend upon the temperature. The drum is preferably rotated throughout the operation and is provided with flint-pebbles or equivalent refractory balls, which serve to pulverize the ore, to remove any coating or incrustation which may form, and to break up any lumps or aggregates consisting of particles bound together by melted sulfur or otherwise. The liberated sulfur remains mixed with the gangue and may be recovered by melting, distillation, or in any other suitable manner.

For a full understanding of our invention reference is made to the accompanying drawing, wherein a preferred form of apparatus is shown in vertical longitudinal section, the ore-drum being shown in elevation with parts broken away.

The apparatus shown comprises a revoluble drum 1, which may be of boiler-iron lined, as indicated at 2, with a material unaffected by the chlorin, such as lead or a refractory enamel or clay composition. The drum has hollow trunnions 3 4, similarly lined and supported in journal-boxes 5, carried by standards 6. A gear-wheel 7 for rotating the drum is secured on trunnion 4. A suitable opening 8 is provided for filling and discharging the drum. The drum is preferably mounted within a casing 9, which is conveniently of boiler-iron, having a door 10 and covered with asbestos or other heat-insulator 11, flues 12 13 serving for the introduction and escape of heating-gases when heat is applied.

The ore or charge under treatment is indicated at 14, and 15 15 are balls or pebbles, preferably of a hard and refractory rock, as flint, serving during the rotation of the drum to pulverize the ore, to remove therefrom any coating or incrustation, and to prevent the formation of lumps during the reaction. The result of so treating the charge during the progress of the reaction is to continually expose fresh reacting surfaces and to permit the complete chlorination of the metal or metals of the ore with such a limited quantity of chlorin that no substantial amount of the chlorid of the metalloid is produced.

A separation between the metallic chlorid and the metalloid may be effected in any desired manner. Thus the metallic chlorid may be leached out by means of any appropriate and well-known solvent, the metalloid being afterward recovered from the gangue, or in case of sulfid ores the sulfur may be distilled from the metal chlorids and the latter subsequently separated from the gangue. At the low temperature requisite for the distillation of sulfur no appreciable amount of the metallic chlorids will be reconverted into sulfids.

We claim—

1. The process which consists in reacting with chlorin on a pulverulent ore containing a metal or metals and a metalloid, producing the chlorid of the metal or metals of the ore and recovering the metalloid in elemental state, substantially as described.

2. The process which consists in reacting with chlorin on a pulverulent sulfid ore, producing the chlorid of the metal or metals of the ore, and recovering the sulfur in elemental state, substantially as described.

3. The process which consists in reacting with chlorin on an ore containing a metal and a metalloid, and simultaneously abrading the charge to expose fresh reacting surfaces, substantially as described.

4. The process which consists in reacting with chlorin on a sulfid ore and simultaneously abrading the charge to expose fresh reacting surfaces, substantially as described.

In testimony whereof we affix our signatures in presence of two witnesses.

CHARLES E. BAKER.
ARTHUR W. BURWELL.

Witnesses:
C. A. DIEHL,
J. L. MALM.